(12) United States Patent
Meeks et al.

(10) Patent No.: US 12,459,607 B2
(45) Date of Patent: *Nov. 4, 2025

(54) FLANGED HDPE MARINE BOOM, MARINE BOOM SYSTEM, AND LUG PLATE

(71) Applicant: WORTHINGTON PRODUCTS INCORPORATED, East Canton, OH (US)

(72) Inventors: Paul S. Meeks, East Canton, OH (US); Marc Schneider, East Canton, OH (US); Jon Garver, East Canton, OH (US)

(73) Assignee: WORTHINGTON PRODUCTS INCORPORATED, East Canton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/729,371

(22) PCT Filed: Feb. 23, 2022

(86) PCT No.: PCT/US2022/017420
§ 371 (c)(1),
(2) Date: Jul. 16, 2024

(87) PCT Pub. No.: WO2023/146558
PCT Pub. Date: Aug. 3, 2023

(65) Prior Publication Data
US 2025/0100653 A1 Mar. 27, 2025

Related U.S. Application Data

(60) Provisional application No. 63/303,220, filed on Jan. 26, 2022, provisional application No. 63/303,232,
(Continued)

(51) Int. Cl.
*B63B 22/04* (2006.01)
*B63B 5/24* (2006.01)
(Continued)

(52) U.S. Cl.
CPC ............... *B63B 22/04* (2013.01); *B63B 5/24* (2013.01); *B63B 22/16* (2013.01); *E02B 15/085* (2013.01);
(Continued)

(58) Field of Classification Search
CPC ......... B63B 22/04; B63B 22/16; B63B 35/62; B63B 35/44; B63B 69/00; B63B 2241/00;
(Continued)

(56) References Cited

U.S. PATENT DOCUMENTS 2,228,529 A    1/1941  Moeller
3,482,393 A *  12/1969 Marshall ................. F16G 15/04
                                              254/134.3 R
(Continued)

OTHER PUBLICATIONS

International Search Report filed in corresponding PCT Application No. PCT/US22/17420 dated Apr. 19, 2022; 4 pages.
(Continued)

*Primary Examiner* — Daniel V Venne
(74) *Attorney, Agent, or Firm* — Black McCuskey

(57) ABSTRACT

A High-Density Polyethylene (HDPE) marine boom includes an elongated generally cylindrical shell including inner and outer layers formed from HDPE with the same formulation. The inner layer includes at least 2% carbon black by mass and the outer layer does not include carbon black. The outer layer includes a colorant with ultraviolet stabilizers and the inner layer does not include the colorant. The inner layer is thicker than the outer layer and they have been coextruded to form a unitary body. First and second caps, each including a radially extending circumferential
(Continued)

annular flange, formed from the same material as the outer layer are fusion welded to the shell across the full thickness and around a full circumference of first ends and second ends of the shell and form a watertight seal. A floatation billet is in the shell. A lug plate for the HDPE marine boom is also disclosed.

14 Claims, 18 Drawing Sheets

Related U.S. Application Data filed on Jan. 26, 2022, provisional application No. 63/303,224, filed on Jan. 26, 2022, provisional application No. 63/303,217, filed on Jan. 26, 2022, provisional application No. 63/303,259, filed on Jan. 26, 2022.

(51) Int. Cl.
*B63B 22/16* (2006.01)
*E02B 15/08* (2006.01)

(52) U.S. Cl.
CPC ....... *B63B 2207/00* (2013.01); *B63B 2231/40* (2013.01)

(58) Field of Classification Search
CPC ... B63B 2207/00; B63B 2231/40; B63B 5/24; E02B 3/00; E02B 3/04; E02B 3/20; E02B 15/00; E02B 15/04; E02B 15/085; E02B 15/0892; B63G 9/04

USPC ...... 441/48, 49, 54, 136; 114/264, 266, 267, 114/382; 405/60, 63, 66, 70, 71, 72
See application file for complete search history.

(56) References Cited

U.S. PATENT DOCUMENTS

| | | | |
|---|---|---|---|
| 3,685,297 A | 8/1972 | Juodis | |
| 4,016,726 A * | 4/1977 | Campbell | ........... E02B 15/0814 405/71 |
| 4,295,756 A * | 10/1981 | Blair | .................. E02B 15/0814 24/453 |
| 4,507,017 A * | 3/1985 | Magoon | .............. E02B 15/0814 405/71 |
| 5,439,315 A | 8/1995 | MacKenzie | |
| 5,713,698 A * | 2/1998 | Worsley | ................ E02B 15/085 280/515 |
| 7,086,421 B2 | 8/2006 | Backman | |
| 7,140,599 B1 * | 11/2006 | Spink | .................... E02B 15/085 405/71 |
| 7,828,494 B1 | 11/2010 | Reynolds | |
| 10,577,058 B2 * | 3/2020 | Meeks | ................ E02B 15/0807 |
| 2018/0073665 A1 | 3/2018 | Bombino | |

OTHER PUBLICATIONS

Written Opinion filed in corresponding PCT Application No. PCT/US22/17420 dated Apr. 20, 2022; 6 pages.
International Preliminary Report on Patentability filed in the corresponding PCT Application dated Jul. 30, 2024; 7 pages.

* cited by examiner

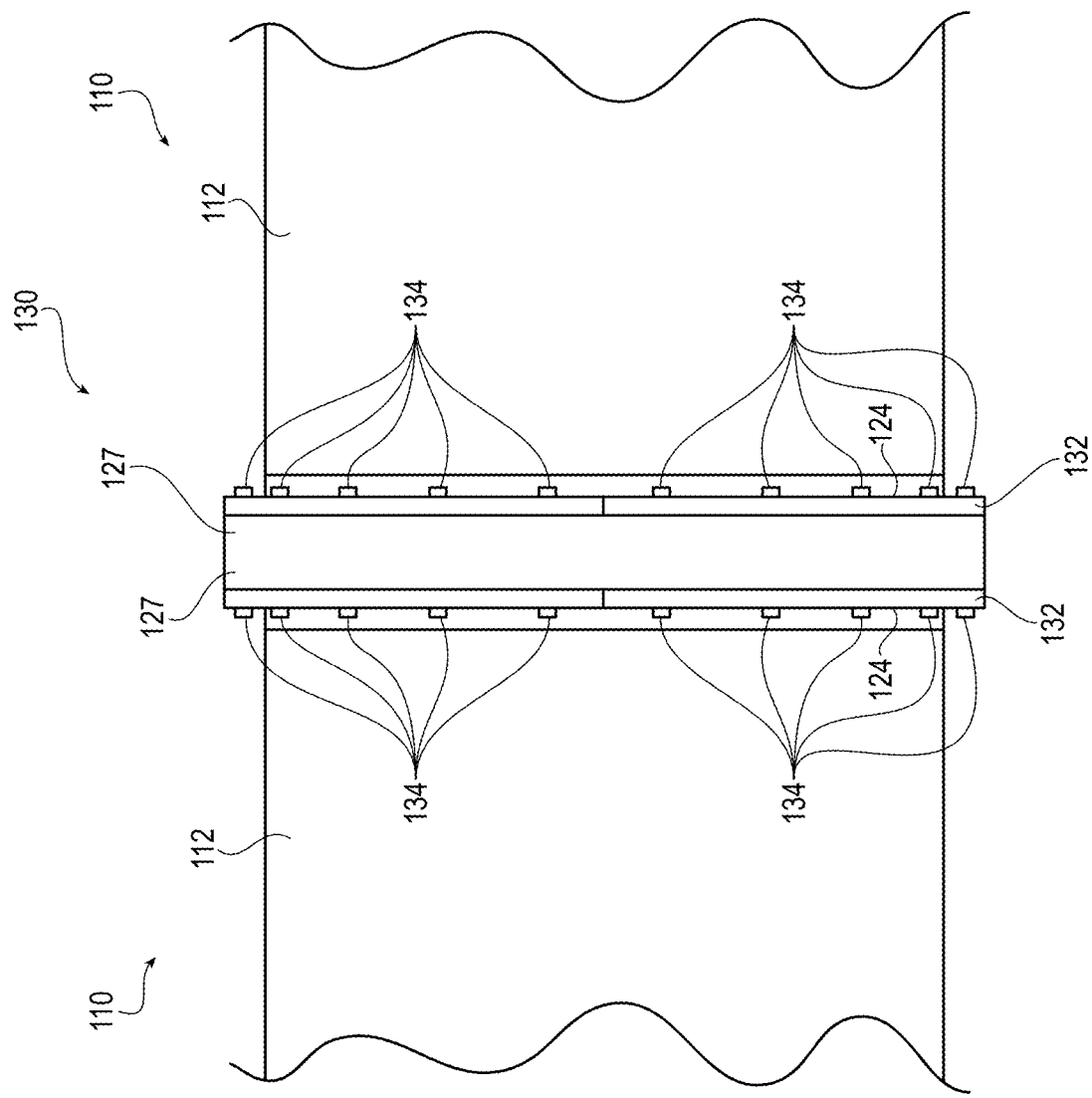

FLANGED HDPE MARINE BOOM, MARINE BOOM SYSTEM, AND LUG PLATE

CROSS-REFERENCE TO RELATED APPLICATIONS

This application claims priority to and the benefit of U.S. Provisional Patent Application Nos. 63/303,217, 63/303,220, 63/303,224, 63/303,232, and 63/303,259, all filed on Jan. 26, 2022, the contents of which are hereby incorporated by reference in their entirety.

BACKGROUND

This relates in general to marine barriers such as marine booms.

Marine booms are often utilized to form certain types of waterway barrier. For example, some marine booms are used to form containment barriers. Some marine booms are used to form navigational barriers. Generally, these waterway barrier systems include a number of buoyant marine boom bodies that float at or about the water's surface and are connected together.

SUMMARY

This relates more particularly to a flanged HDPE marine boom, a marine boom system, and a lug plate.

A marine boom system includes at least one High-Density Polyethylene (HDPE) marine boom having an elongated generally cylindrical shell having an inner layer and an outer layer, where the inner layer and outer layer are formed from HDPE with the same formulation, with the inner layer further including at least 2% carbon black by mass and the outer layer does not include carbon black and the outer layer further including a colorant with ultraviolet stabilizers and the inner layer does not include the colorant. The inner layer is thicker than the outer layer. The inner layer and outer layer have been coextruded to form a unitary body. The shell defines a cavity and has first and second ends. First and second caps formed from the same material as the outer layer are disposed about the first and second ends respectively. Each cap includes a generally cylindrical main body having an outer diameter and an inner diameter equal to an outer diameter and an inner diameter of the shell, and an end wall extends across one end of the main body, and a circumferential annular cap flange extends radially from the main body and has an inner flange diameter equal to the outer diameter of the main body and has an outer flange diameter greater than the outer diameter of the main body. The circumferential annular cap flange has a plurality of equal sized apertures disposed about the flange at equal radial placement and at equal circumferential spacing. The other end of the main body of each of the first and second caps are axially aligned with the first and second ends of shell respectively and are fusion welded together across the full thickness and around a full circumference of the first ends and the second ends and forming a watertight seal. A floatation billet disposed within the cavity in the shell.

The marine boom system may include a number of HDPE marine booms connected together to form at least a portion of a boom line, where the HDPE marine booms are connected flange to flange with the end walls of each HDPE marine boom abutting one another with a steel plate backing ring being disposed about each of the annular cap flanges on the shell side of the flange. The backing ring includes a plurality of ring apertures aligning with the apertures of the flange with plurality of flange fasteners extend through the flange apertures and ring apertures joining the HDPE marine booms together. The flange fasteners may comprise a series of bolts with a bolt head on one side and a structural locknut on the other. The backing rings may comprise four equal and identically shaped parts.

The marine boom system may include one or more HDPE marine booms including an end lug plate. The end lug plate includes a generally circular main base plate formed from steel, defining a central axis, and has a plurality of equally spaced apertures aligned with the central axis formed in an outer circumferential portion of the base plate. A pair of generally isosceles triangle shaped planar steel flanges are disposed with a long side of each flange upon the base plate and extend equidistant from and parallel to a diameter of the base plate, with an apex of the flange opposite the long side extending in a direction parallel to the central axis. The flanges welded to the base plate. The end lug plate also includes first and second steel reinforcement members disposed between the flanges, and are equally spaced from a center of the base plate, and oriented perpendicular to the base plate and the flanges, and welded to the flanges and the base plate. The end lug plate also includes first and second pairs of generally triangle shaped planar reinforcing buttresses oriented in the same plane as the first and second steel reinforcement members respectively, located on sides of the first and second flanges opposite the first and second steel reinforcement members respectively, and are welded to the flanges and the base plate. The lug plate is connected to one of the end caps with the base plate abutting the end wall and the central axis of the base plate longitudinally coaxially aligned with the shell and end caps with the plurality of apertures in the base plate aligned with the plurality of apertures in the flange. A steel plate backing ring is disposed about the annular cap flanges on the shell side of the flange, the backing ring including a plurality of ring apertures aligning with the apertures of the flange with a plurality of flange fasteners extend through the flange apertures and ring apertures joining the end cap of the HDPE marine boom and the lug plate together. The flange fasteners may comprise a series of bolts with a bolt head on one side and a structural locknut on the other. The backing ring may comprise four equal and identically shaped parts.

The marine boom system may further include a strap system including at least two tethers mounted to at least one of the HDPE marine booms with the tethers extending generally parallel along the longitude of the shell, and at least one strap including at least two strap passageways each having at least one of the tethers passing therethrough, where the tethers are mounted between the first and second flanges and secured to the flange fasteners or secured to the shell. The tethers may be vinyl coated steel wire and the straps may be made of weather durable nylon.

Thickness of the inner layer of the shell of the marine boom to thickness of the outer layer of the shell of the marine boom may be in a ratio of approximately 7 to 1.

The HDPE marine boom may further include a graphic formed on a piece of polymer film and fuses to the shell by flame treating the polymer film and the outer layer of the shell until each at least partially liquefies and then allowing the two to cure together.

The HDPE marine boom may further include a hand hold block including a main attachment body having a rear surface having a curvature coincident with an outer curvature of the shell and including a plurality of mounting apertures and including a grasp portion extending outwardly and upwardly from the attachment body. The hand hold block may be disposed about an outer circumferential surface of the shell with the rear surface facing the outer circumferential surface, and include a plurality of mounting fasters each extending through a perspective mounting aperture an into the outer layer of the shell or inserts in the shell.

Various aspects will become apparent to those skilled in the art from the following detailed description and the accompanying drawings.

BRIEF DESCRIPTION OF THE DRAWINGS

FIG. 6 is a partial side schematic view of an HDPE marine boom system including two of the HDPE marine booms of FIG. 1 connected together at their annular cap flanges.

DETAILED DESCRIPTION

Figure 1:
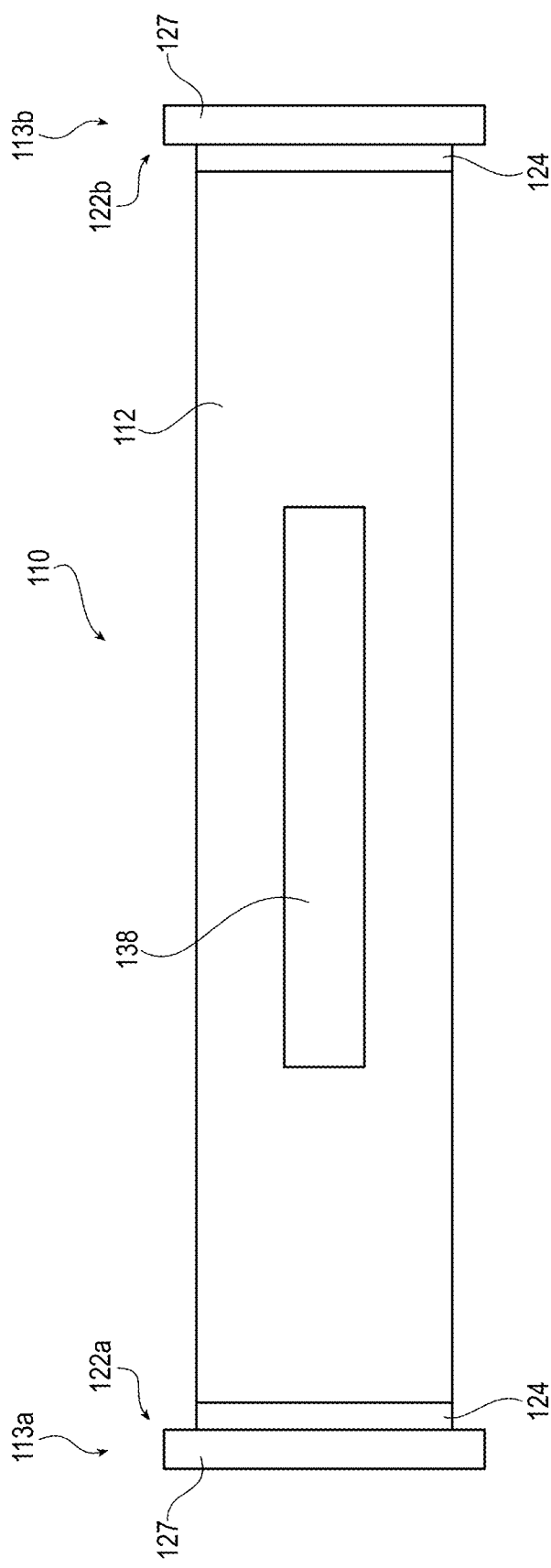
FIG. 1 is a front view of a flanged HDPE marine boom.
Figure 2:
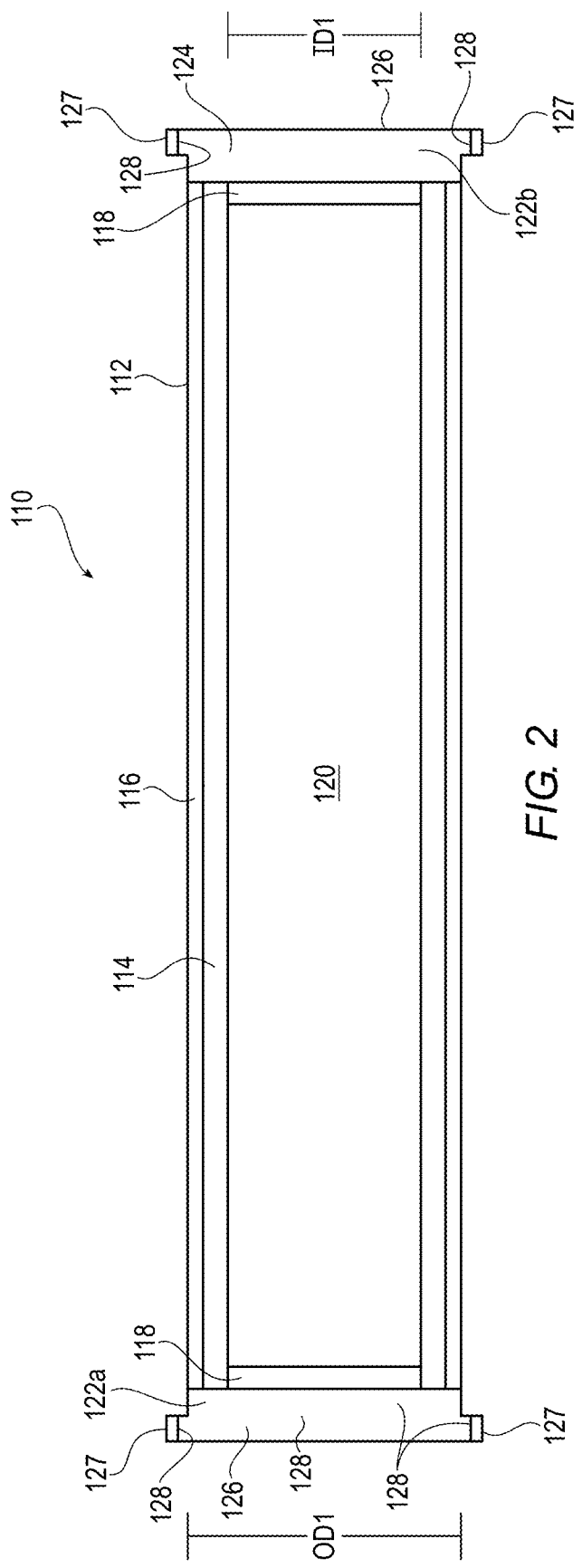
FIG. 2 is a is a longitudinal cross-sectional view of the shell, billet, and end caps of the boom of FIG. 1.
Figure 3:
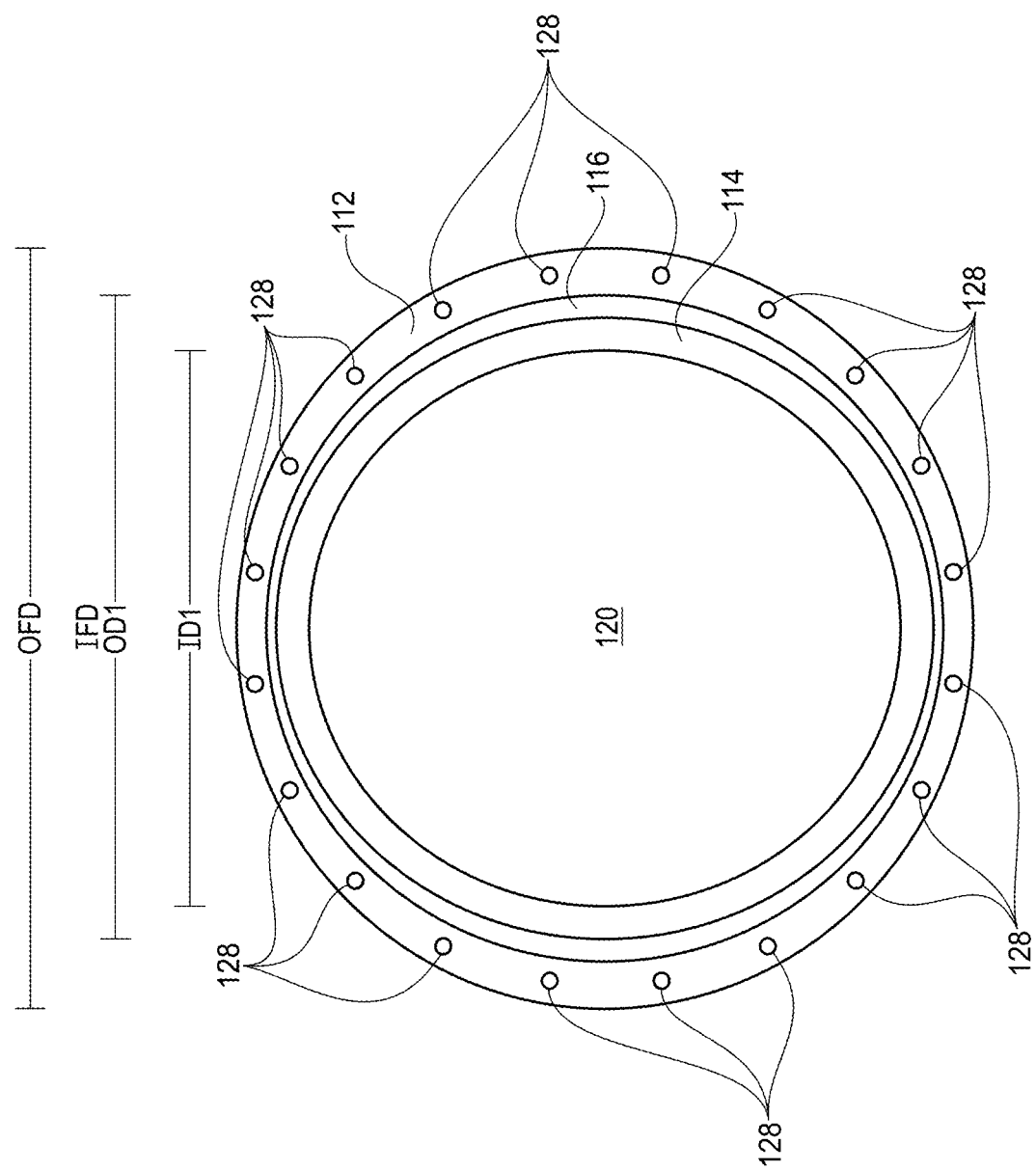
FIG. 3 is a is a lateral cross-sectional view of the shell, and billet of the marine boom of FIG. 1.

There is shown in FIG. 1 a High-Density Polyethylene (HDPE) marine boom 110. The marine boom 110 includes an elongated generally cylindrical shell 112 having first and second ends 113*a* and 113*b*. As best shown in FIGS. 2 and 3, the shell 112 has an outer diameter OD1 and an inner diameter ID1. The shell 112 includes an inner layer 114 and an outer layer 116. The inner layer 114 and outer layer 116 are formed from an HDPE with the same formulation, with the inner layer 114 further including at least 2% carbon black by mass and the outer layer 116 not including carbon black, and the outer layer 116 further includes a colorant with ultraviolet stabilizers and antioxidants and the inner layer 114 does not include the colorant. For example, the material for the inner and outer layers 114 and 116 may be ASTM (D3350) HDPE produced according to ASTM D 3350-14 PE 445444 C/E with C refereeing to a 2% minimum carbon black in the inner layer 114 and E referring to the addition of a colorant with UV stabilizer and antioxidants in the outer layer 116. The inner layer 114 and outer layer 116 have been coextruded to form a unitary body for the shell 112. In one preferred embodiment the thickness of the inner layer 114 to the outer layer 116 is in a ratio of approximately 7 to 1. For one example, the inner layer 114 may have a thickness of 28 mm while the outer layer has a thickness of 4 mm. However, it is generally always preferred that that the inner layer 114 is thicker than the outer layer 116. It is noted that the carbon free outer layer 116 is generally translucent, except for the added colorant, and that the inner layer 114 is generally black due to the addition of carbon black. Thus, one factor in the determination of the thickness of the outer layer 116 is the perception of the color desired, as a thinner outer layer 116 would appear darker than a relatively thicker outer layer 116.

The marine boom 110 also includes an optional graphic 138 fusion welded to the outer layer 116. The graphic includes an image formed on a piece of polymer film which has been fused to the shell 112 by flame treating the polymer film and the outer layer 116 until each at least partially liquefies and then allowing the two to cure together.

The shell 112 defines cavity 118. A floatation billet 120 disposed within the cavity 118 of the shell 112. In various embodiments, the billet 120 is formed as monolithic body and disposed in the shell 112 as a unitary piece, formed in pieces and joined into a single piece disposed in the cavity 118 of the shell 112, formed as a monolithic body cut into pieces disposed in the cavity as discrete pieces, or formed as separate pieces disposed in the cavity as discrete pieces. The billet 120 is preferably made of a foam plastic, polymer, or resin, with a preferred example being expandable polystyrene.

It has been discovered that due to the effects of gravity, the shell 112 of the marine boom 110 generally rests slightly out of round. Further, it has been discovered that the shell 112 being formed from HDPE has a tendency to slightly shrink when in relatively colder environments. This particularly true for the shell 112, which has been coextruded with the outer layer 116 free of carbon black. Thus, in at least one embodiment, it is preferred that the diameter of the billet 120 is less than the inner diameter of the shell 112, particularly preferably at least ⅛th of an inch less.

Figure 5:
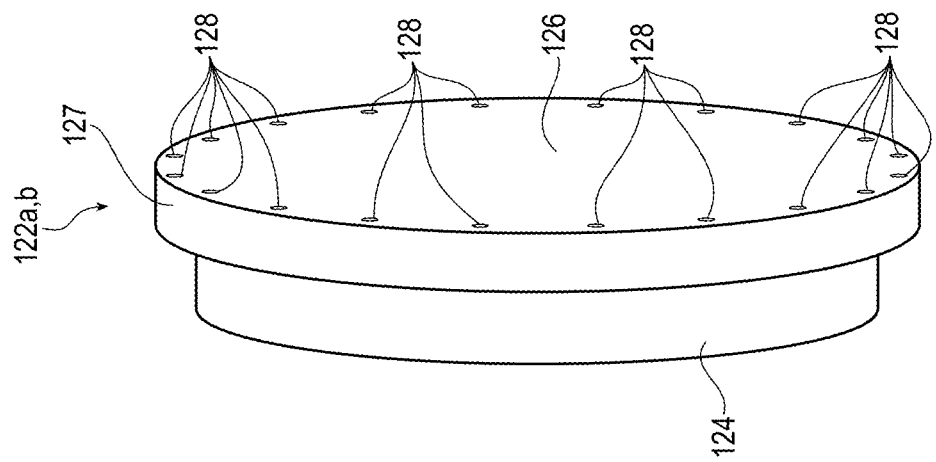
FIG. 5 is an outside end perspective schematic representation of one of the end caps of the marine boom of FIG. 1.
Figure 4:
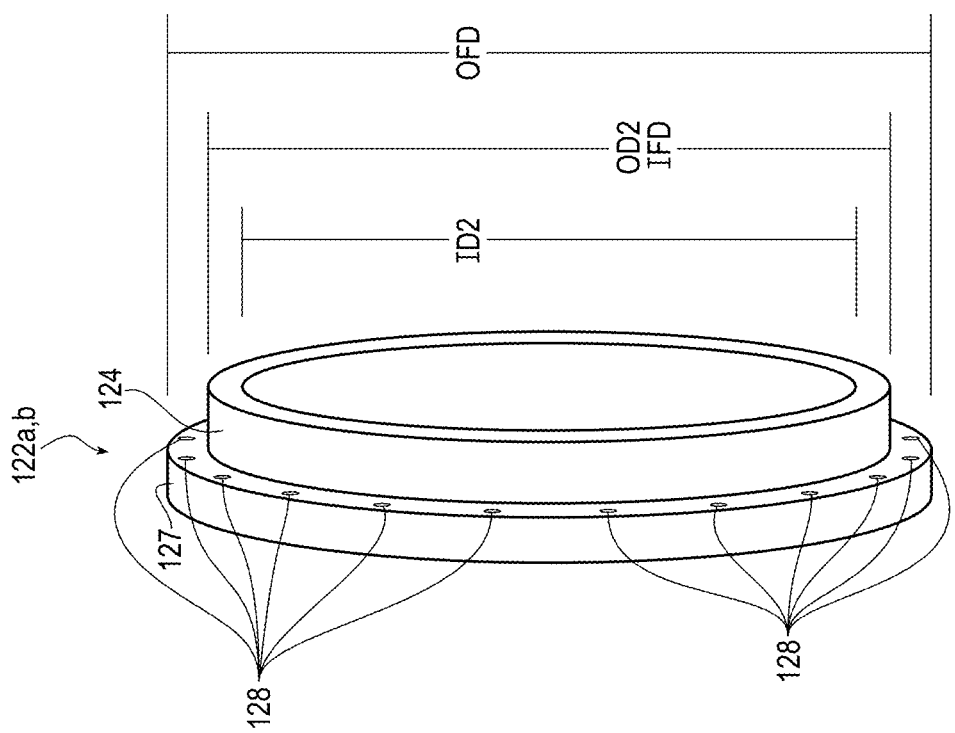
FIG. 4 is a is an inside end perspective schematic representation of one of the end caps of the marine boom of FIG. 1.

The marine boom 110 includes first and second end caps 122*a* and 122*b*, see also FIGS. 4 and 5. The first and second caps 122*a* and 122*b* are preferably formed from the same material as the outer layer 116. The first and second end caps 122*a* and 122*b* are disposed about the first and second ends 113*a* and 113*b*, respectively. Each cap 122*a* and 122*b* includes generally cylindrical main body 124 having an outer diameter OD2 and an inner diameter ID2 equal to the outer diameter OD1 and an inner diameter ID1 of the shell. An end wall 126 extends across one end of the main body 124 with a circumferential annular cap flange 127 extending radially from the end wall 126 including a plurality of apertures 128. The annular cap flange 127 has an inner flange diameter IFD equal to the outer diameter OD1 of the main body 124 and having an outer flange diameter OFD greater than the outer diameter OD of the main body 124. The plurality of apertures 128 are preferably generally equal sized and preferably disposed about the annular cap flange 127 at generally equal radial placement and at generally equal circumferential spacing.

The other end of the main body 124 of each of the first and second caps 122a and 122b are axially aligned with the first and second ends 113a and 113b of the shell 112 respectively and are fusion welded together across the full thickness of the first and second ends 113a and 113b and around the full circumference of the first and second ends 113a and 113b forming a watertight seal. In a preferred embodiment the outer circumferential surface of the marine boom 110 at the weld joint of the shell 112 and caps 112a and 122b is a continuous and even surface with the remainder of the circumferential. For example, a weld bead formed after fusion weld may be removed by chiseling, shaving, or other mechanisms.

Figure 7:
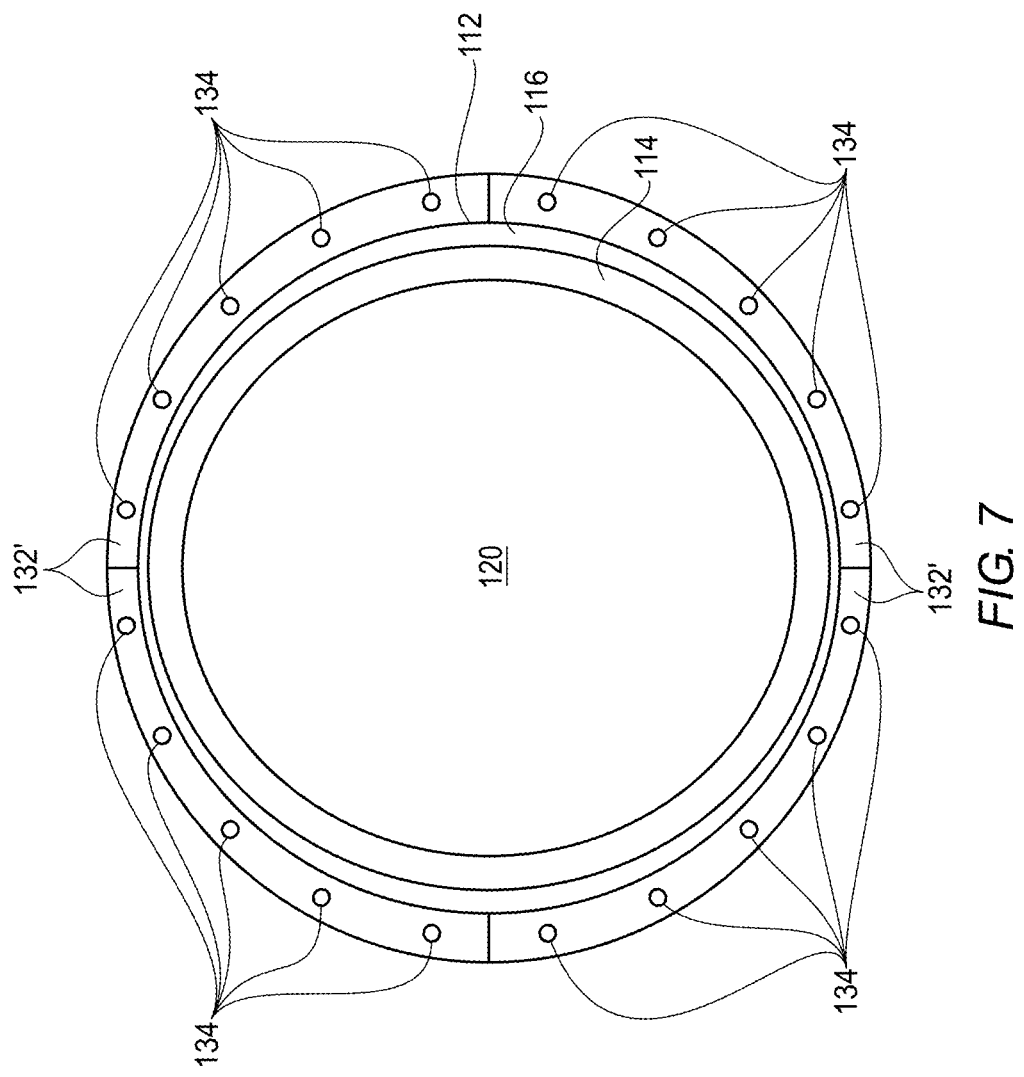
FIG. 7 is a lateral cross-sectional view of one of the booms of FIG. 6

As best shown in FIGS. 6 and 7, in at least one embodiment a plurality of HDPE marine booms 110 are directly connected together for form a marine boom system 130, e.g., a continuous-length boom line. The HDPE marine booms 110 are connected flange 127 to flange 127 with the end walls 126 abutting one another. A steel plate backing ring 132 is disposed about each of the annular cap flanges 127 on the shell 112 side of the flange 127. The backing ring includes a plurality of ring apertures aligning with the apertures of the flange 127. It is preferred that the ring 132 comprises four equal and identically shaped parts 132'. A plurality of flange fasteners 134 extend through the flange apertures and ring apertures to joining the booms 110 together. Preferably, the flange fasteners 134 are a series of bolts with a bolt head on one side and a structural locknut on the other. Most preferably the structural locknut is an ANCO self-locking nut with ratchet pin.

Figure 8:
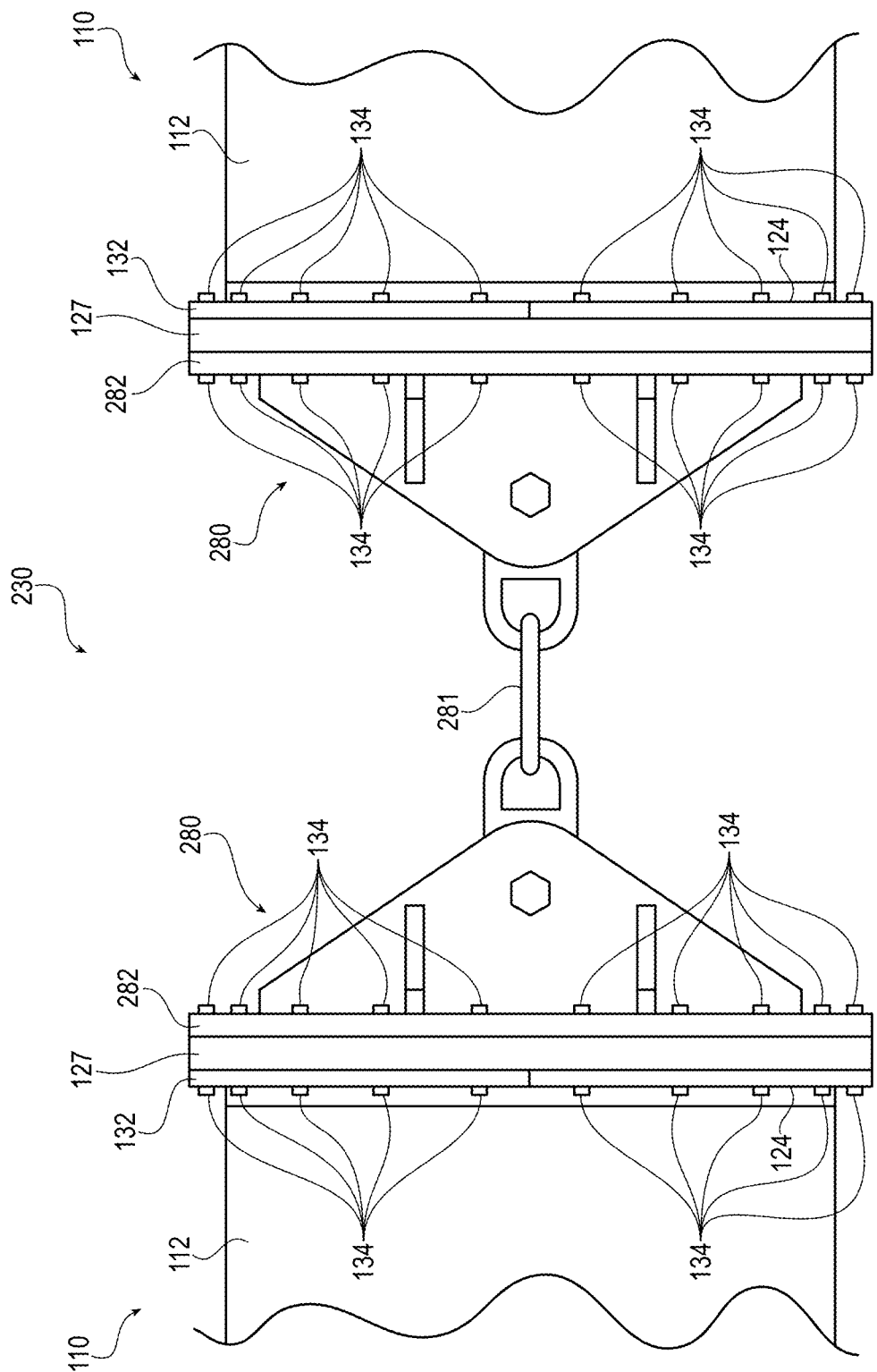
FIG. 8 is a partial side schematic view of an HDPE marine boom system including two of the HDPE marine booms of FIG. 1 connected together with a chain connected to lug plates connected to their annular cap flanges.
Figure 9:
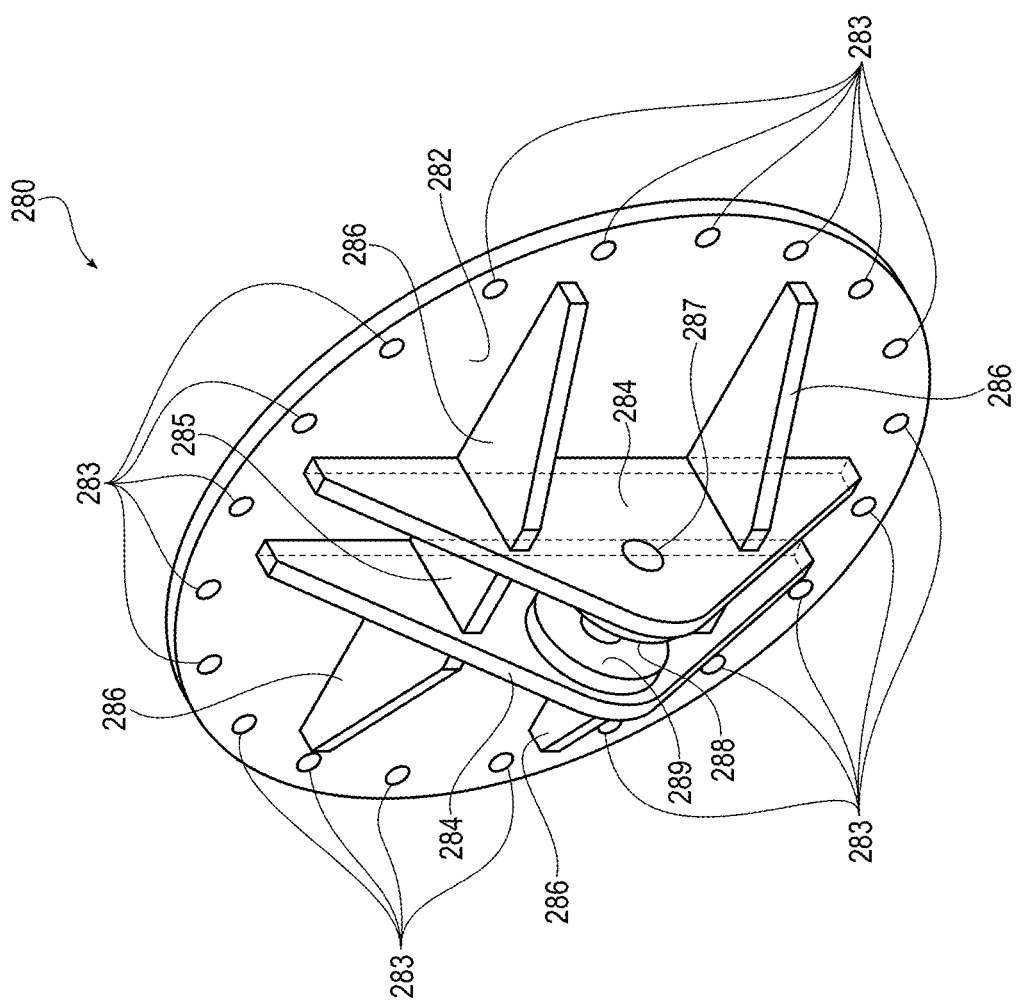
FIG. 9 is a top right perspective schematic view of one of the lug plates of FIG. 8.
Figure 10:
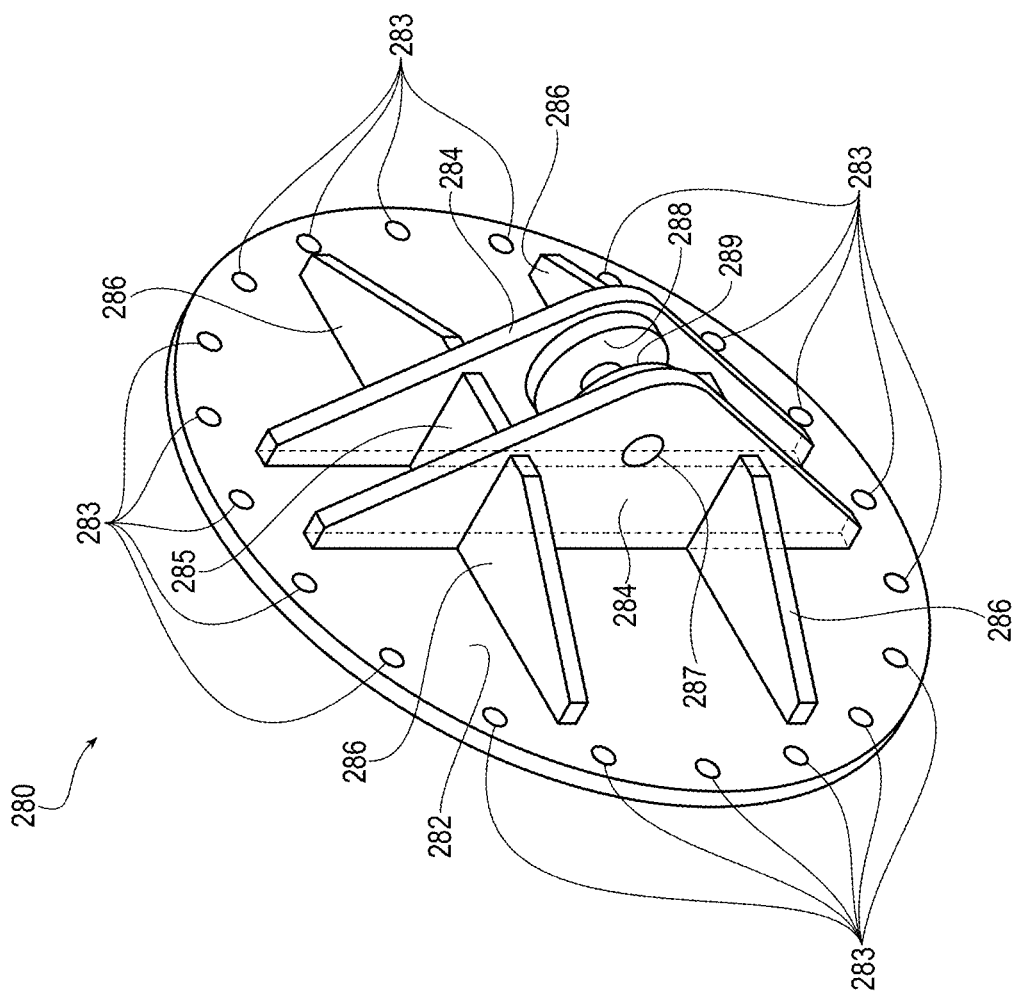
FIG. 10 is a top left perspective schematic view of one of the lug plates of FIG. 8.
Figure 11:
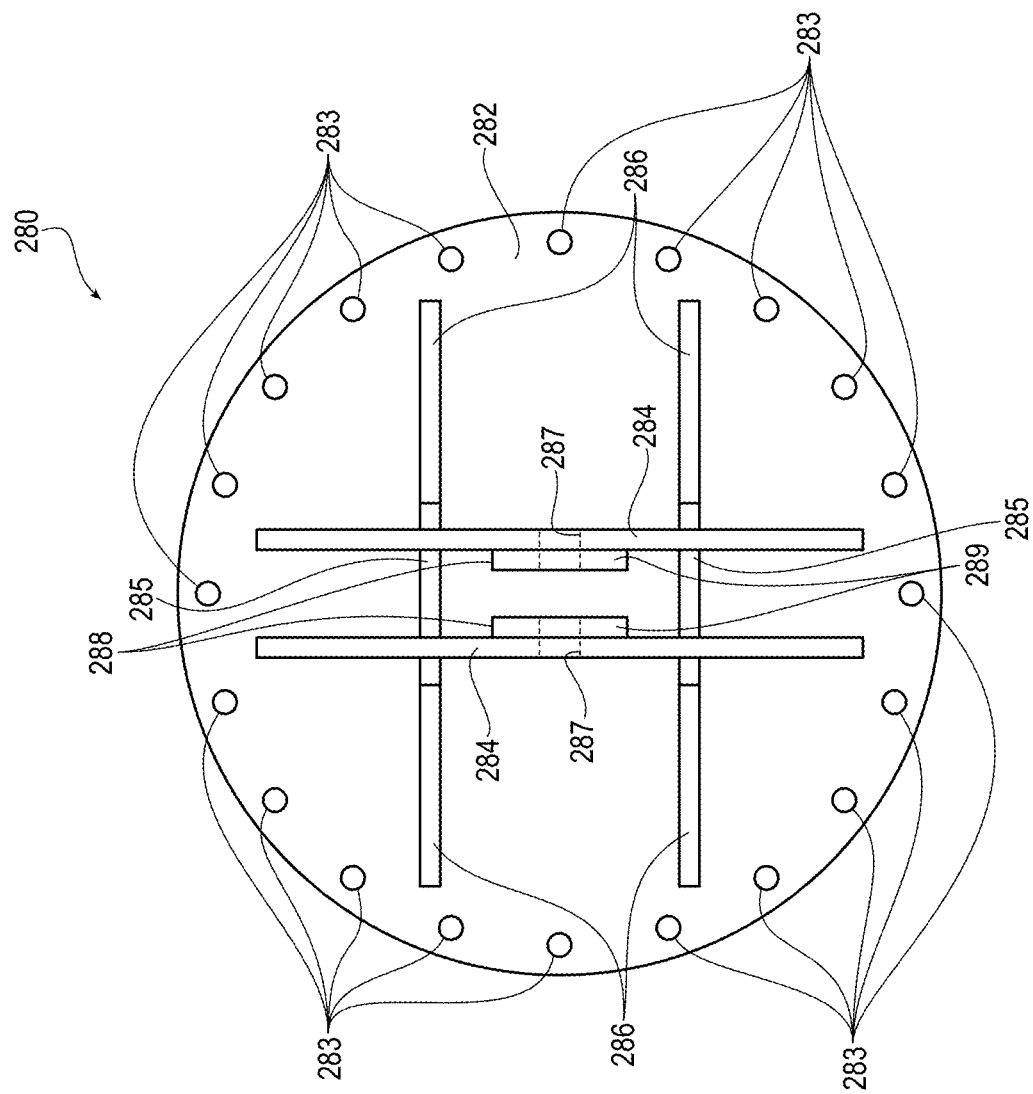
FIG. 11 is a front schematic view of one of the lug plates of FIG. 8.
Figure 12:
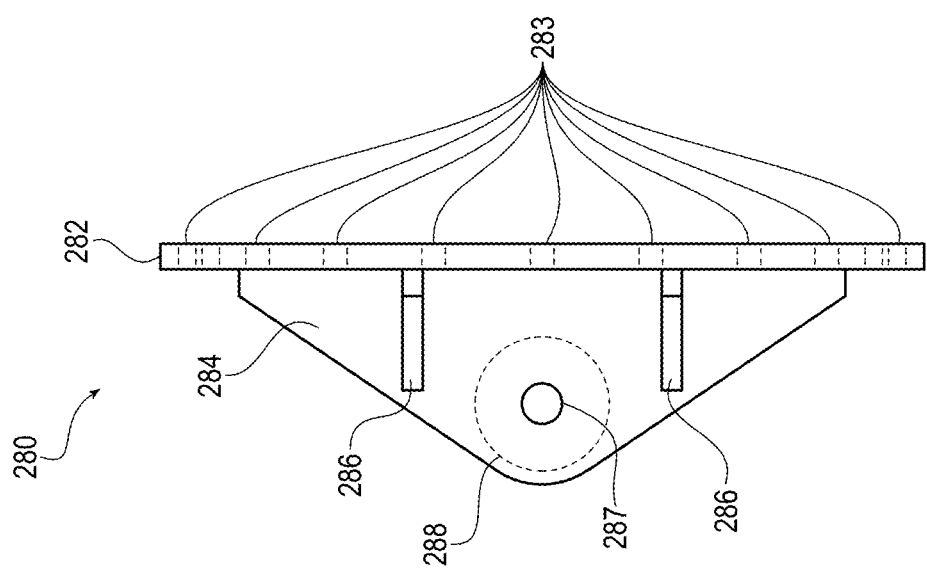
FIG. 12 is a right side schematic view of one of the lug plates of FIG. 8.
Figure 13:
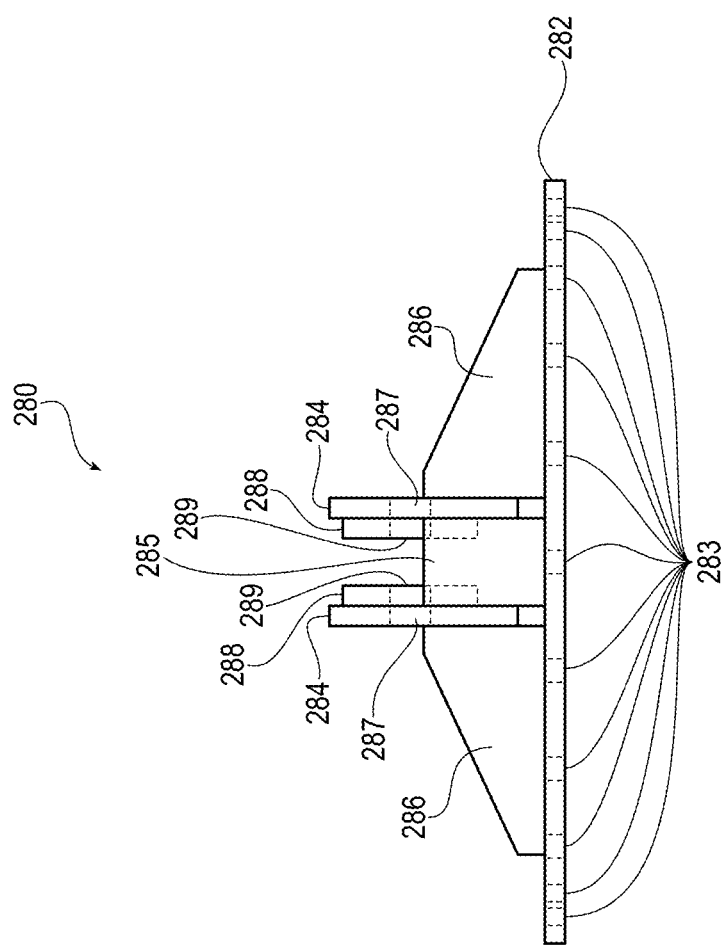
FIG. 13 is a top schematic view of one of the lug plates of FIG. 8.
Figure 14:
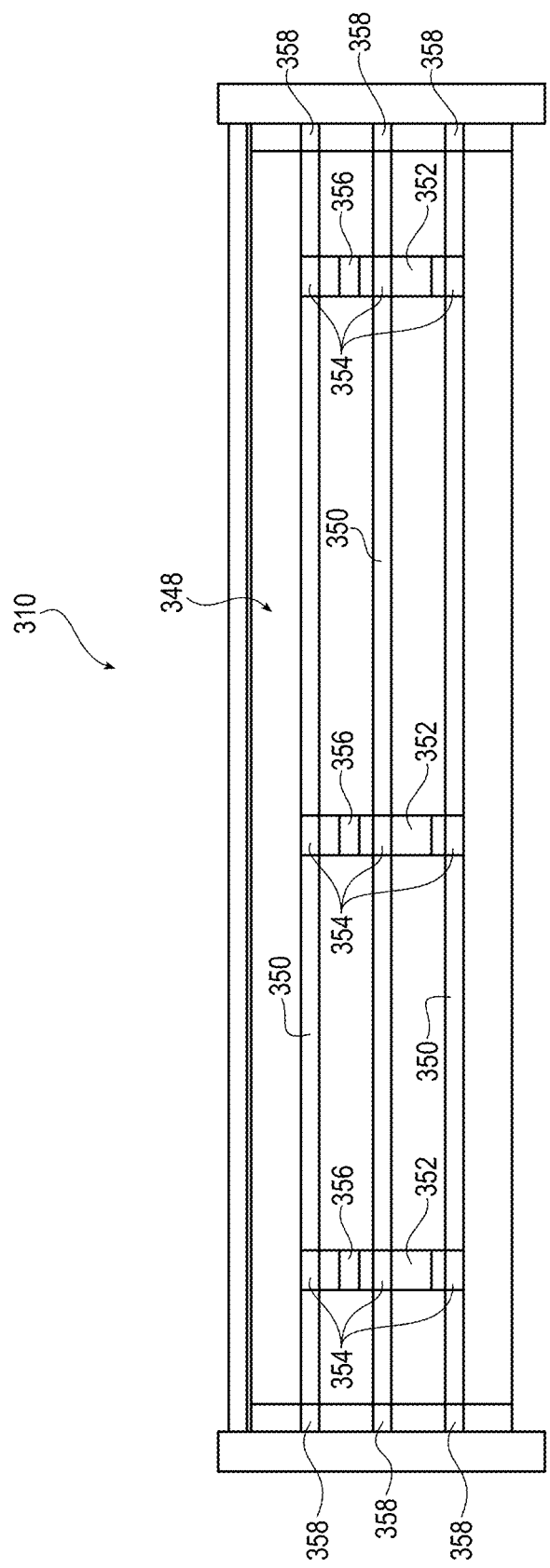
FIG. 14 is a front view of the flanged HDPE marine boom of FIG. 1 with a strap system.
Figure 15:
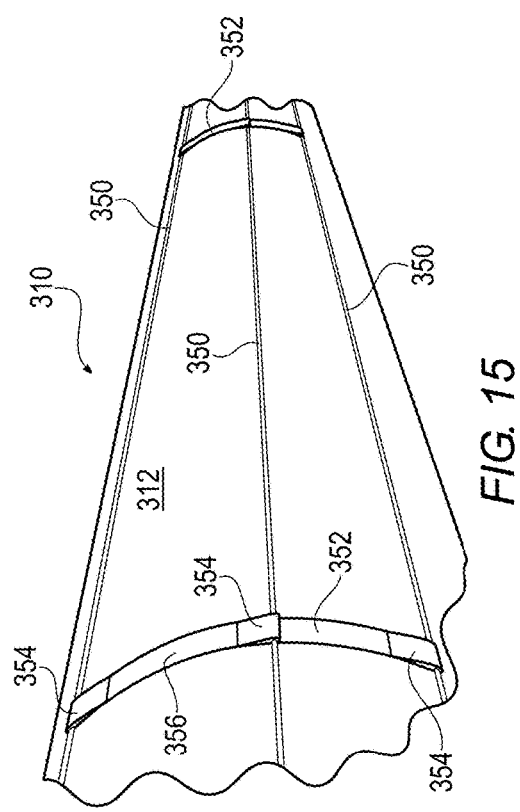
FIG. 15 is a partial perspective view of the HDPE marine boom and strap system of FIG. 14.
Figure 17:
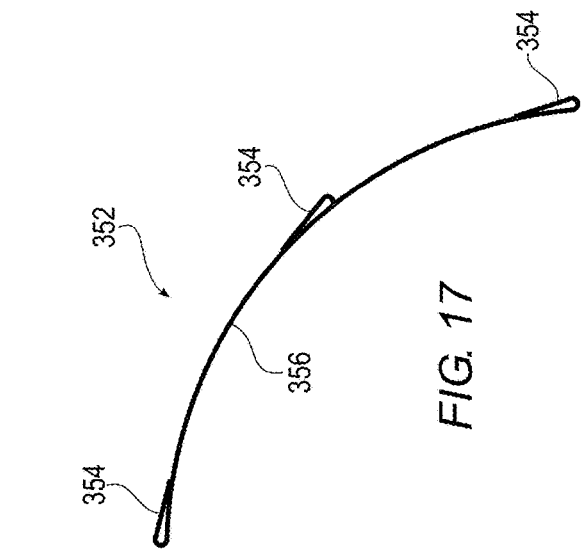
FIG. 17 is a side view of the strap of FIG. 14.
Figure 16:
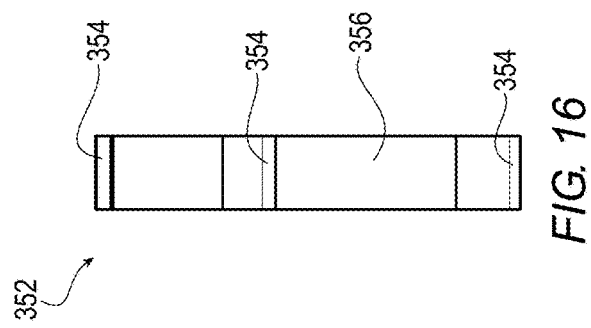
FIG. 16 is a front view of the strap of FIG. 14.
Figure 18:
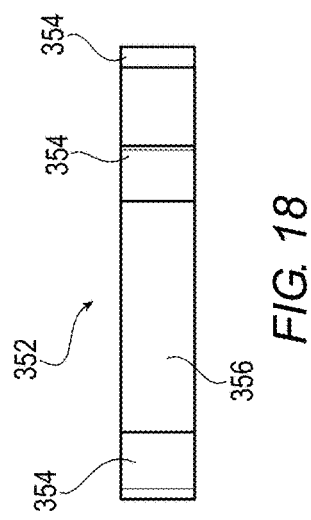
FIG. 18 is a top view of the strap of FIG. 14.
Figure 20:
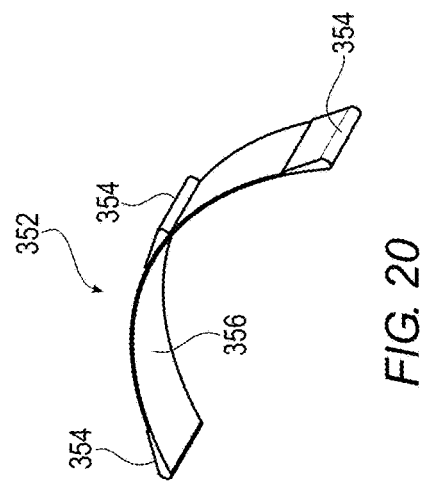
FIG. 20 is a bottom perspective view of the strap of FIG. 14.
Figure 19:
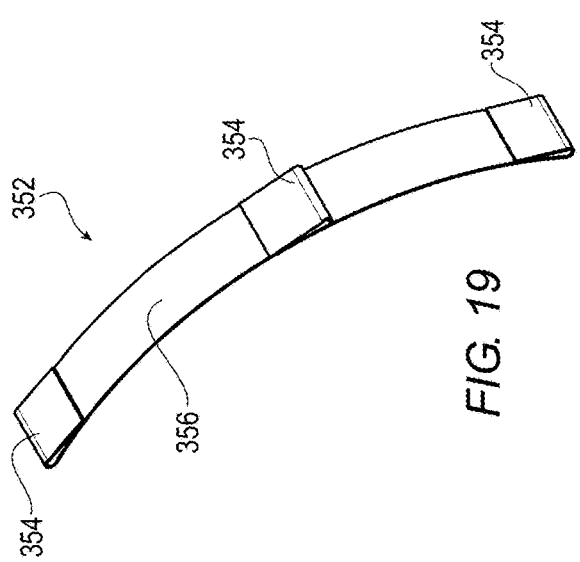
FIG. 19 is a front perspective view of the strap of FIG. 14.
Figure 22:
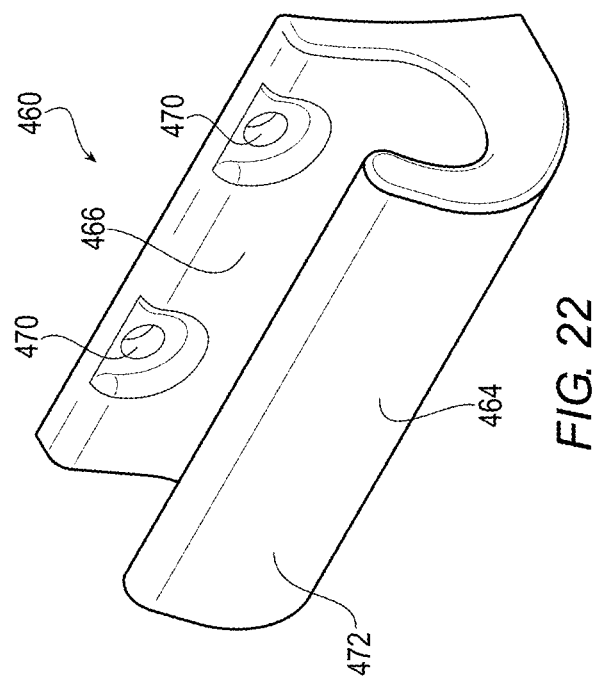
FIG. 22 is a top right perspective view of the hand hold of FIG. 21.
Figure 21:
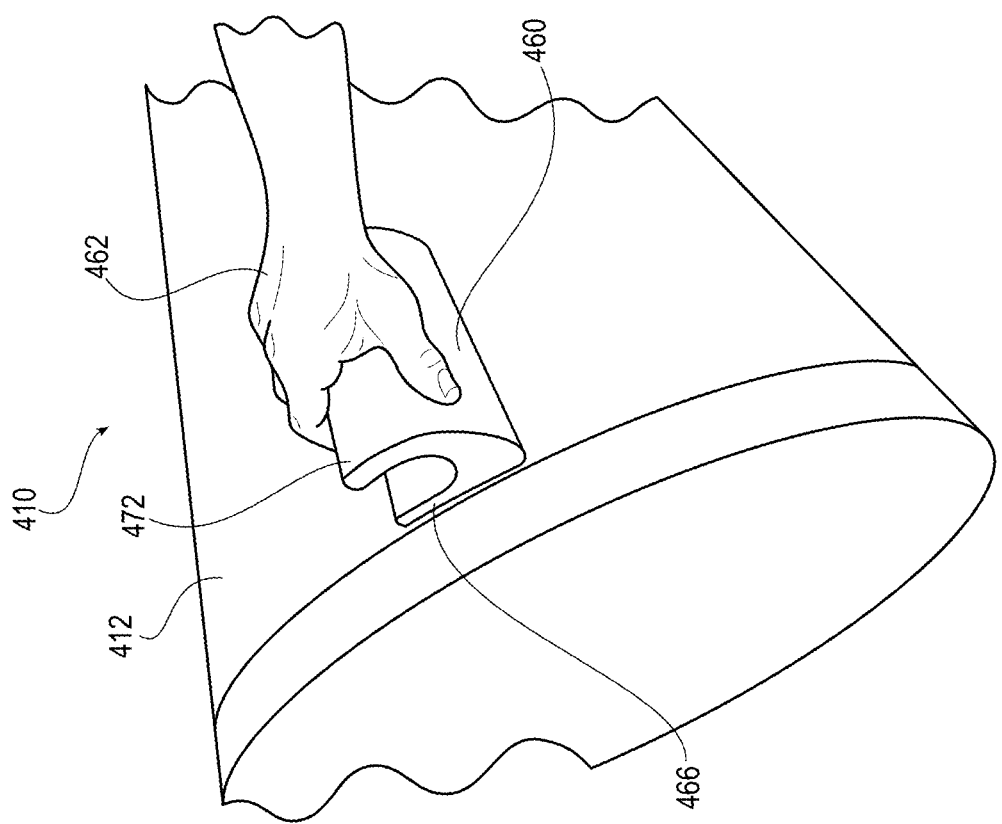
FIG. 21 is an HDPE marine boom with a hand hold.
Figure 24:
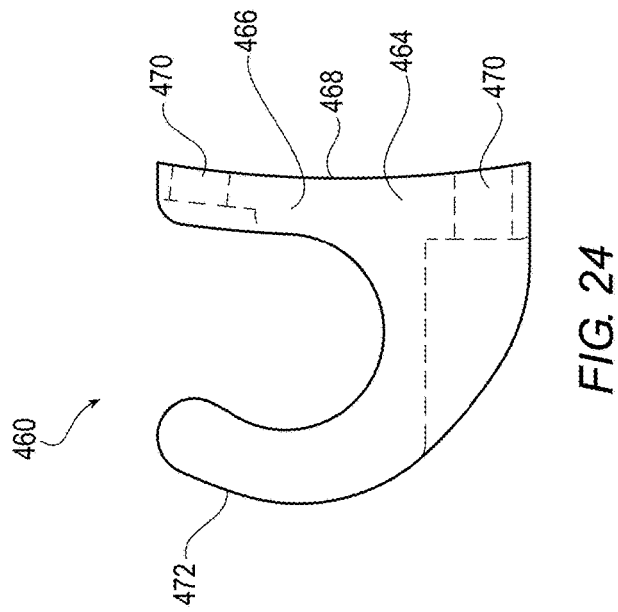
FIG. 24 is a side schematic view of the hand hold of FIG. 21.
Figure 23:
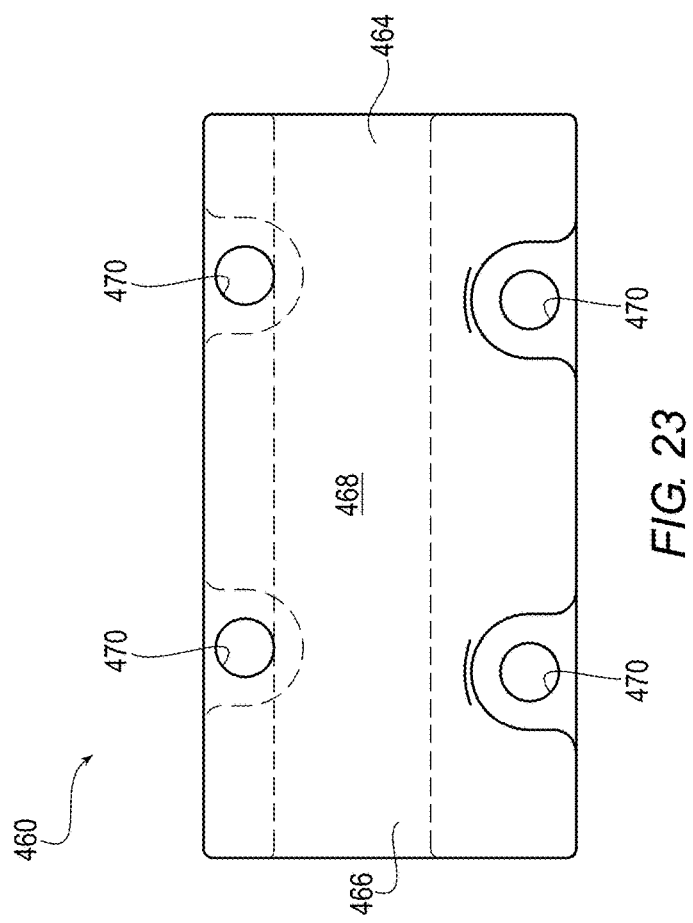
FIG. 23 is a back schematic view of the hand hold of FIG. 21.
Figure 25:
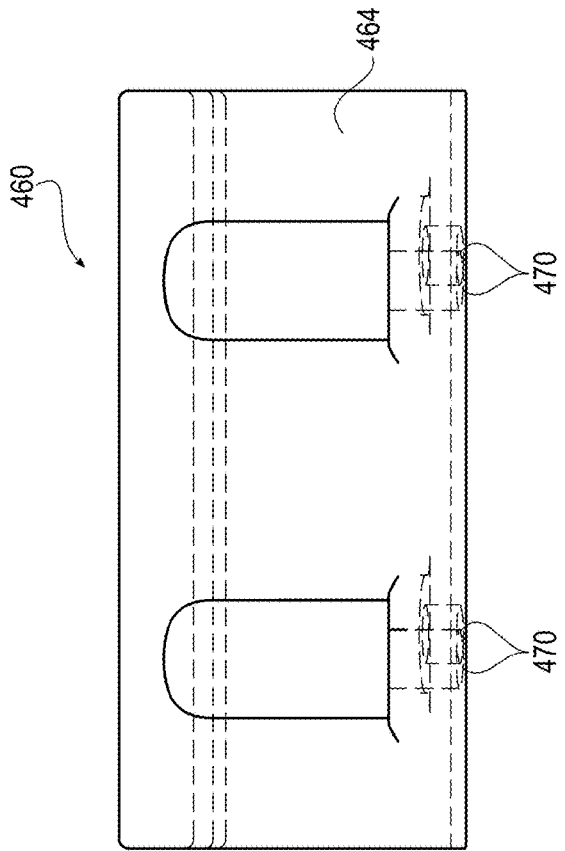
FIG. 25 is a bottom schematic view of the hand hold of FIG. 21.
Figure 26:
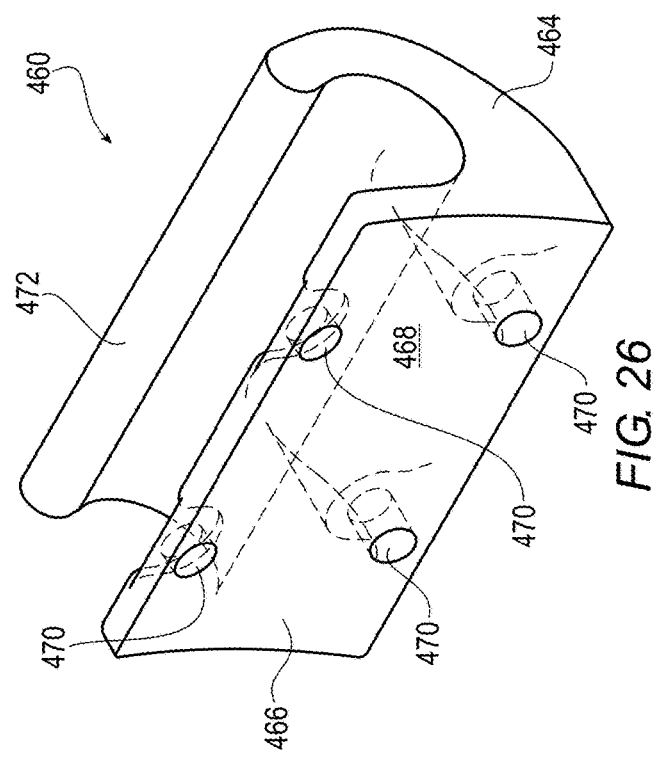
FIG. 26 is a back top perspective schematic view of the hand hold of FIG. 21.

As best shown in FIG. 8, in at least one embodiment a plurality of HDPE marine booms 110 include end lug plates 280, as best shown in FIGS. 9-13 and as will be further described below, and are connected together, for example by shackles and/or chain 281, to form a marine boom system 230, e.g., a boom line.

The lug plate 280 is connected to one of the end caps 122a, 122b with a base plate 282 abutting the end wall 126 and a central axis of the base plate 282 longitudinally coaxially aligned with the shell 112 and end caps 122a, 122b with a plurality of apertures 283 in the base plate 282 aligned with the plurality of apertures in the flange 127. A steel plate backing ring 132 is disposed about each of the annular cap flanges 127 on the shell 112 side of the flange 127. The backing ring 132 includes a plurality of ring apertures aligning with the apertures of the flange 127. It is preferred that the ring 132 comprises four equal and identically shaped parts 132'. A plurality of flange fasteners 134 extend through the ring apertures, the flange apertures and the apertures 283 of the base plate 282 to joining the lug plates 280 and the end caps 122a, 122b together. Preferably, the flange fasteners 134 are a series of bolts with a bolt head on one side and a structural locknut on the other. Most preferably the structural locknut is an ANCO self-locking nut with ratchet pin.

The end lug plate 280 includes the generally circular main base plate 282 formed from steel, defining a central axis, and having the plurality of equally spaced apertures 283 aligned with the central axis formed in an outer circumferential portion of the base plate. A pair of generally isosceles triangle shaped planar steel flanges 284 are disposed with a long side of each flange 284 upon the base plate 282, and extend equidistant from and parallel to a diameter of the base plate 282, with an apex of the flange 284 opposite the long side extending in a direction parallel to the central axis. The flanges 284 are preferably welded to the base plate 282. First and second steel reinforcement members 285 disposed between the flanges, equally spaced from a center of the base plate 282, oriented perpendicular to the base plate 282 and the flanges 284, and welded to the flanges 284 and the base plate 282. First and second pairs of generally triangle shaped planar reinforcing buttresses 286 oriented in the same plane as the first steel reinforcement members 285, located on sides of the first and second flanges 284 opposite the first steel reinforcement members 285 respectively, and welded to the flanges 284 and the base plate 282. A pair of apertures 287 are each formed in each the flanges 284 proximate the apexes. Central axes of the apertures 287 are aligned across the center of the base plate 280. A pair of steel reinforcement discs 288 having central apertures 289 are welded to the flanges 284 with the central apertures 289 of the discs 288 aligned with the pair of apertures 287 on the flanges 284. The discs 288 are each disposed closer to the center of the base plate 282 than the flanges 284.

Referring now to FIGS. 14-20, there is shown another HDPE marine boom 310, similar to the marine boom 110 described above, numbered with similar identifiers for similar components, and described with the differences below. The marine boom 310 includes a strap system 348. In one use, the strap system 348 is provided as a grasp for a person who may be in the water with the marine boom 310. The strap system 348 includes at least two tethers 350 (three are shown) mounted to the marine boom 310 and extending generally parallel along the longitude of a shell 312 of the marine boom 310. The tethers 350 are preferably vinyl coated steel wire, although such is not required. At least one strap 352 is disposed along the tethers 350 and positioned generally perpendicular there to. Each strap 352 includes at least strap passageways 354 (three shown) each having at least one of the tethers 350 passing therethrough. The strap is formed with a generally planar main body 356 which conforms to the outer surface of the shell 312 when installed there on. The straps 350 are preferably made of a weather durable nylon, although such is not required. The strap system 348 includes connectors 358 to mount the strap system 348 to the marine boom 310. In the illustrated example the tethers 350 are mounted to the annular cap flanges 327 of the marine boom 310. In one example, the tethers 350 are fastened directly to the structure rings 328a and 328b. In a preferred example, a turnbuckle is included along the tethers 350 and/or between the tethers 350 and the annular cap flanges 327 in order to adjust the tension on the tethers 350. For further example, mounting tabs may be fixed to the annular cap flanges 327 and the tethers 350 then attached to the mounting tabs. Preferably such tabs are attached to flange fasteners 134 and extend radially along the flange toward the shell and bend, for example 90 degrees, and then extend longitudinally along the shell 312 parallel to the tethers 350. Alternatively, the tethers 350 may be mounted directly to the shell 312 by anchoring the tethers to the shell 312. This may include the direct use of fasteners, or insets may be placed in the shell 312 and then the tethers fastened to the shell 312 in cooperation with the insets. This may optionally include one or more turnbuckles to adjust the tension of the tethers 350.

Referring now to FIGS. 21-26, there is shown a portion of another HDPE marine boom 410, similar to the marine booms 110, numbered with similar identifiers for similar components, and described with the differences below. The marine boom 410 includes a hand hold 460. In one use, the hand hold 460 is provided as a grasp for a person 462 who may be in the water with the marine boom 410.

The hand hold 460 forms a hand hold block 464 including a main attachment body 466 having a rear surface 468 having a curvature coincident with an outer curvature of a shell 412 of the marine boom 410. A plurality of mounting apertures 470 are formed in the hand hold block 464 through the main attachment body 466. In the illustrated example, there are four apertures 470 with a first pair of two apertures 470 aligned horizontally toward the top of the main attachment body 466 and a second pair of two apertures aligned horizontally toward the bottom of the main attachment body, with the first and secondly pairs being longitudinally offset. The hand hold 460 is mounted directly to the shell 412 by anchoring the main attachment body 466 to the shell 412. This may include the direct use of fasteners through the apertures 470 cooperating with the shell 412, or insets may be placed in the shell 412 and then fasteners through the apertures 470 cooperate with the inserts, such as spin welded inserts fixed in holes routed into the shell 412. Thus, the hand hold block 464 is disposed about an outer circumferential surface of the shell 412 with the rear surface 468 facing the outer circumferential surface and coincident therewith. The hand hold 460 includes a grasp portion 472 formed in the hand hold block 464 and extending outwardly and upwardly from the attachment body 466.

While principles and modes of operation have been explained and illustrated with regard to particular embodiments, it must be understood, however, that this may be practiced otherwise than as specifically explained and illustrated without departing from its spirit or scope.

What is claimed is:

1. A marine boom system comprises
at least one High-Density Polyethylene (HDPE) marine boom including:
an elongated generally cylindrical shell including an inner layer and an outer layer, where the inner layer and outer layer are formed from HDPE with a same formulation, with the inner layer further including at least 2% carbon black by mass and the outer layer does not include carbon black and the outer layer further including a colorant with ultraviolet stabilizers and the inner layer does not include the colorant, the inner layer being thicker than the outer layer, where the inner layer and outer layer have been coextruded to form a unitary body, the elongated generally cylindrical shell defining a cavity, the elongated generally cylindrical shell having first and second ends;
first and second caps formed from a same material as the outer layer disposed about the first and second ends respectively, each cap including a generally cylindrical main body having an outer diameter and an inner diameter equal to an outer diameter and an inner diameter of the elongated generally cylindrical shell, and an end wall extending across one of the first and second ends of the generally cylindrical main body, and a circumferential annular cap flange extending radially from the generally cylindrical main body and having an inner flange diameter equal to the outer diameter of the generally cylindrical main body and having an outer flange diameter greater than the outer diameter of the generally cylindrical main body, the circumferential annular cap flange having a plurality of equal sized apertures disposed about the circumferential annular cap flange at equal radial placement and at equal circumferential spacing, where the other of the first and second ends end of the generally cylindrical main body of each of the first and second caps are axially aligned with the first and second ends of the elongated generally cylindrical shell respectively and are fusion welded together across a full thickness and around a full circumference of the first ends and the second ends and forming a watertight seal; and
a floatation billet disposed within the cavity in the elongated generally cylindrical shell.

2. The marine boom system of claim 1 where the at least one HDPE marine boom includes first and second HDPE marine booms connected together to form at least a portion of a boom line, where the first and second HDPE marine booms are connected flange to flange with end walls of each of the first and second HDPE marine booms abutting one another, and each of the first and second HDPE marine booms further comprising a steel plate backing ring is disposed about each of the circumferential annular cap flanges on the elongated generally cylindrical shell side of the circumferential annular cap flange, the backing ring including a plurality of ring apertures aligning with the apertures of the circumferential annular cap flange with a plurality of flange fasteners extend through the apertures of the circumferential annular cap flange and the ring apertures joining the first and second HDPE marine booms together.

3. The marine boom system of claim 2 where the plurality of flange fasteners comprise a series of bolts with a bolt head on one side of the circumferential annular cap flange and a structural locknut on the other side of the circumferential annular cap flange.

4. The marine boom system of claim 2 where each backing ring comprises four equal and identically shaped parts.

5. The marine boom of claim 2 further comprising a strap system including at least two tethers mounted to at least one of the first and second HDPE marine booms and extending generally parallel along the elongated generally cylindrical shell, and at least one strap including at least two strap passageways each having at least one of the tethers passing therethrough, where the tethers are mounted between the first and second circumferential annular cap flanges and secured to the plurality of flange fasteners.

6. The marine boom system of claim 1 where the at least one HDPE marine boom includes an end lug plate comprising:
a generally circular main base plate formed from steel, defining a central axis, and having a plurality of equally spaced apertures aligned with the central axis formed in an outer circumferential portion of the generally circular main base plate"
a pair of generally isosceles triangle shaped planar steel flanges disposed with a long side of each generally isosceles triangle shaped planar steel flange upon the generally circular main base plate, extending equidistant from and parallel to a diameter of the generally circular main base plate, and with an apex of the generally isosceles triangle shaped planar steel flange opposite the long side extending in a direction parallel to the central axis, the generally isosceles triangle shaped planar steel flanges welded to the generally circular main base plate;

first and second steel reinforcement members disposed between the generally isosceles triangle shaped planar steel flanges, equally spaced from a center of the generally circular main base plate, oriented perpendicular to the generally circular main base plate and the generally isosceles triangle shaped planar steel flanges, and welded to the generally isosceles triangle shaped planar steel flanges and the generally circular main base plate;

and first and second pairs of generally triangle shaped planar reinforcing buttresses oriented in a same plane as the first and second steel reinforcement member respectively, located on sides of the first and second generally isosceles triangle shaped planar steel flanges opposite the first and second steel reinforcement members respectively, and welded to the generally isosceles triangle shaped planar steel flanges and the generally circular main base plate, where the end lug plate is connected to one of the caps with the generally circular main base plate abutting the end wall and the central axis of the generally circular main base plate longitudinally coaxially aligned with the elongated generally cylindrical shell and caps with the plurality of apertures in the generally circular main base plate aligned with the plurality of apertures in the circumferential annular cap flange, and the at least one HDPE marine boom further comprising a steel plate backing ring disposed about the circumferential annular cap flanges on the elongated generally cylindrical shell side of the circumferential annular cap flange, the backing ring including a plurality of ring apertures aligning with the apertures of the circumferential annular cap flange with plurality of flange fasteners extend through the apertures of the circumferential annular cap flange and the ring apertures joining the cap of the at least one HDPE marine boom and the end lug plate together.

7. The marine boom system of claim 6 where the plurality of flange fasteners comprise a series of bolts with a bolt head on one side of the circumferential annular cap flange and a structural locknut on the other side of the circumferential annular cap flange.

8. The marine boom system of claim 6 where each backing ring comprises four equal and identically shaped parts.

9. The marine boom of claim 6 further comprising a strap system including at least two tethers mounted to at least one of the first and second HDPE marine booms and extending generally parallel along the elongated generally cylindrical shell, and at least one strap including at least two strap passageways each having at least one of the tethers passing therethrough, where the tethers are mounted between the first and second circumferential annular cap flanges and secured to the plurality of flange fasteners.

10. The marine boom of system of claim 1 where the thickness of the inner layer of the elongated generally cylindrical shell of the marine boom to thickness of the outer layer of the elongated generally cylindrical shell of the marine boom is in a ratio of approximately 7 to 1.

11. The marine boom system of claim 1 where the at least one HDPE marine boom further includes a graphic formed on a piece of polymer film and fuses to the elongated generally cylindrical shell by flame treating the polymer film and the outer layer of the elongated generally cylindrical shell until each at least partially liquefies and then allowing the graphic and the elongated generally cylindrical shell to cure together.

12. The marine boom system of claim 1 where the at least one HDPE marine boom further includes a hand hold block including a main attachment body having a rear surface having a curvature coincident with an outer curvature of the elongated generally cylindrical shell and including a plurality of mounting apertures and including a grasp portion extending outwardly and upwardly from the main attachment body, the hand hold block disposed about an outer circumferential surface of the elongated generally cylindrical shell with the rear surface facing the outer circumferential surface, and including a plurality of mounting fasters each extending through a perspective mounting aperture an into the outer layer of the elongated generally cylindrical shell or inserts in the elongated generally cylindrical shell.

13. The marine boom system of claim 1 where the at least one HDPE marine boom further includes a strap system including at least two tethers mounted to the elongated generally cylindrical shell of the marine boom and extending generally parallel along the elongated generally cylindrical shell, and at least one strap including at least two strap passageways each having at least one of the tethers passing therethrough.

14. The marine boom system of claim 13 where the tethers mounted to the elongated generally cylindrical shell of the marine boom are vinyl coated steel wire and the straps are made of weather durable nylon.

* * * * *